United States Patent
Glugla

(10) Patent No.: US 10,422,292 B2
(45) Date of Patent: Sep. 24, 2019

(54) METHODS AND SYSTEMS FOR AN EXHAUST OXYGEN SENSOR OPERATION

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 264 days.

(21) Appl. No.: 15/470,482

(22) Filed: Mar. 27, 2017

(65) Prior Publication Data

US 2018/0274469 A1 Sep. 27, 2018

(51) Int. Cl.
F02D 41/14 (2006.01)
F02D 41/02 (2006.01)
F02P 5/145 (2006.01)
G01M 15/10 (2006.01)
F02P 5/15 (2006.01)

(52) U.S. Cl.
CPC ..... *F02D 41/1494* (2013.01); *F02D 41/0235* (2013.01); *F02D 41/0245* (2013.01); *F02D 41/1454* (2013.01); *F02P 5/1455* (2013.01); *F02D 2200/021* (2013.01); *F02P 5/1502* (2013.01); *F02P 5/1506* (2013.01); *G01M 15/104* (2013.01)

(58) Field of Classification Search
CPC .......... F02D 41/1494; F02D 41/0235; F02D 41/0245; F02D 41/1454; F02D 2200/021; F02P 5/1455; F02P 5/1506; G01M 15/104
USPC ...................................... 701/102; 123/406.23
See application file for complete search history.

(56) References Cited

U.S. PATENT DOCUMENTS

| 4,993,386 | A | * | 2/1991 | Ozasa | F01M 3/02 123/1 A |
| 5,077,970 | A | * | 1/1992 | Hamburg | F01N 11/007 60/274 |
| 5,083,427 | A | * | 1/1992 | Anderson | F01N 3/28 60/274 |
| 5,617,829 | A | | 4/1997 | Bidner et al. | |
| 5,663,704 | A | * | 9/1997 | Allen | B60R 25/1001 307/10.2 |
| 5,709,198 | A | * | 1/1998 | Sagisaka | F02D 41/1455 123/684 |

(Continued)

OTHER PUBLICATIONS

Glugla, Chris Paul et al., "Method and System for Engine Control," U.S. Appl. No. 15/181,198, filed Jun. 13, 2016, 54 pages.

(Continued)

*Primary Examiner* — John M Zaleskas
*Assistant Examiner* — Susan E Scharpf
(74) *Attorney, Agent, or Firm* — Greg Brown; McCoy Russell LLP

(57) ABSTRACT

Methods and systems are provided for activating a universal exhaust gas oxygen (UEGO) sensor activation during each of a pre-delivery phase and a post-delivery phase of a vehicle. In one example, a method may include during the pre-delivery phase, following an engine start, using a lower current flowing via a heater coupled to the UEGO sensor to heat the UEGO sensor and during the post-delivery phase, following an engine start, once exhaust temperature reaches a threshold temperature, using a higher current flowing via the heater coupled to the UEGO sensor to heat the UEGO sensor.

18 Claims, 4 Drawing Sheets

(56) References Cited

U.S. PATENT DOCUMENTS

| | | | | |
|---|---|---|---|---|
| 5,732,550 | A * | 3/1998 | Muramatsu | F01N 3/2013 60/274 |
| 5,781,878 | A * | 7/1998 | Mizoguchi | G01N 27/4175 701/109 |
| 5,814,182 | A * | 9/1998 | McElroy, II | B29C 65/2084 156/304.2 |
| 5,852,228 | A * | 12/1998 | Yamashita | F02D 41/1476 73/23.32 |
| 5,964,811 | A * | 10/1999 | Ishii | F02D 41/266 123/479 |
| 5,989,398 | A * | 11/1999 | Young | G01N 25/30 204/408 |
| 6,136,170 | A * | 10/2000 | Inoue | G01N 27/4065 204/408 |
| 6,736,108 | B2 | 5/2004 | Rayl et al. | |
| 6,769,403 | B2 | 8/2004 | Rayl et al. | |
| 7,028,661 | B1 | 4/2006 | Bonne et al. | |
| 7,255,080 | B1 | 8/2007 | Leone | |
| 7,467,628 | B2 | 12/2008 | Adams et al. | |
| 8,050,844 | B2 * | 11/2011 | Hoard | F02D 41/405 123/299 |
| 9,534,984 | B2 | 1/2017 | Glugla et al. | |
| 9,541,014 | B2 * | 1/2017 | Glugla | F02D 31/006 |
| 9,719,436 | B2 * | 8/2017 | Glugla | F02D 13/06 |
| 9,879,618 | B2 * | 1/2018 | Glugla | F02D 13/06 |
| 10,119,515 | B2 * | 11/2018 | Glugla | F02D 37/02 |
| 2003/0041593 | A1 * | 3/2003 | Yoshida | F02D 41/042 60/285 |
| 2007/0271904 | A1 | 11/2007 | Shouda et al. | |
| 2009/0038289 | A1 * | 2/2009 | Oh-Hori | G01N 27/122 60/285 |
| 2009/0143960 | A1 * | 6/2009 | Matsumoto | F01N 9/00 701/109 |
| 2014/0316673 | A1 | 10/2014 | Glugla et al. | |
| 2014/0343827 | A1 | 11/2014 | Glugla et al. | |
| 2015/0176558 | A1 | 6/2015 | Glugla et al. | |
| 2016/0146126 | A1 | 5/2016 | Glugla | F02D 13/06 701/103 |
| 2016/0146127 | A1 * | 5/2016 | Glugla | F02D 31/006 701/104 |
| 2016/0371907 | A1 * | 12/2016 | Ma | E05B 81/82 |
| 2017/0002786 | A1 | 1/2017 | Glugla et al. | |
| 2017/0030321 | A1 | 2/2017 | Glugla et al. | |
| 2017/0030322 | A1 | 2/2017 | Glugla et al. | |
| 2017/0082081 | A1 * | 3/2017 | Glugla | F02D 31/006 |
| 2017/0268440 | A1 * | 9/2017 | Glugla | F02D 13/06 |
| 2018/0022313 | A1 * | 1/2018 | Kim | B60R 25/24 340/5.6 |
| 2018/0361962 | A1 * | 12/2018 | Kim | B60R 16/033 |

OTHER PUBLICATIONS

Glugla, Chris Paul et al., "Methods and Systems for Engine Fueling," U.S. Appl. No. 15/286,355, filed Oct. 5, 2016, 52 pages.

Glugla, Chris Paul et al., "Method and System for Spark Plug Cleaning," U.S. Appl. No. 15/340,190, filed Nov. 1, 2016, 50 pages.

* cited by examiner

METHODS AND SYSTEMS FOR AN EXHAUST OXYGEN SENSOR OPERATION

FIELD

The present description relates generally to methods and systems for adjusting activation of a universal exhaust gas oxygen (UEGO) sensor during each of a pre-delivery phase and a post-delivery phase of a vehicle.

BACKGROUND/SUMMARY

During a pre-delivery phase of a vehicle, that is after the vehicle has been assembled at an assembly plant, and before the vehicle has left the plant, each vehicle subsystem may be tested to ensure that each subsystem is functioning when the vehicle is delivered to a customer. The first key-on event of a vehicle engine, which may occur after vehicle assembly and before the sale of the vehicle, may be associated with an engine green start condition. During the pre-delivery phase, the vehicle may be started and moved a plurality of times. The vehicle system may include one or more oxygen sensors, such as a Universal Exhaust Gas Oxygen (UEGO) sensor, for engine exhaust air-fuel ratio control. At engine key-on, a UEGO sensor heater may be operated to heat the sensor to a threshold temperature, thereby activating the sensor. Prior to activation of the UEGO sensor, the controller may adjust engine fueling via open-loop control (that is, without receiving input from the sensor) and after activation of the UEGO sensor, the controller may switch to a closed-loop control of engine fueling (that is, with input from the sensor).

Various approaches are provided for heat activating a UEGO sensor. In one example, as shown in US 20070271904, Shouda et al. teaches delaying heating of the UEGO sensor until exhaust temperature increases to above a threshold and water condensation can no longer take place on the UEGO sensor elements. Exhaust temperature is increased by retarding ignition timing for a certain period after engine start. By reducing water condensation on the UEGO sensor elements and by delaying UEGO sensor heating, cracking of UEGO sensor elements due to sudden temperature changes may be reduced.

However, the inventors herein have recognized potential disadvantages with the above approach. As one example, during the pre-delivery phase of the vehicle, the vehicle is operated for shorter durations which may not allow adequate engine operation time for a required exhaust temperature increase. In the approach shown by Shouda et al., operating parameters of the engine (such as spark timing) may have to be adjusted in order to increase the exhaust temperature, however, during the pre-delivery phase, a plurality of vehicle systems may be tested, and it may not be desirable to modify engine operating parameters. Also, retarding ignition timing increases fuel consumption. On the other hand, if heating of the UEGO sensor is expedited during short but frequent engine operations in the pre-delivery phase, water condensate formed on the sensor elements may cause cracks in the sensor. During engine cold-start conditions, there may be an even higher possibility of crack formation in the sensor elements during UEGO sensor heating. Sensor degradation may lead to warranty issues and may cause exhaust emissions to be degraded.

In one example, the issues described above may be addressed by an engine method comprising: during a vehicle pre-delivery phase, feed-back controlling an oxygen sensor heater element to a set-point temperature with a first, lower gain, and during a vehicle post-delivery phase, feed-back controlling the oxygen sensor heater element to the set-point temperature with a second, higher gain. In this way, by adjusting a voltage level to supply a lower electric current to heat the UEGO sensor gradually over a longer period, the sensor may be activated with reduced possibility of sensor elements cracking.

As one example, during a pre-delivery phase of a vehicle, when the vehicle is operated for frequent shorter durations, a lower voltage resulting in a first, lower current may be applied to a UEGO heater to heat the UEGO sensor element. The temperature of the UEGO heater sensor element may be feed-back controlled to a set-point temperature (such as an activation temperature of the UEGO sensor) with a first, lower, gain. Due to the lower current and the lower gain, the UEGO sensor may take a longer time to attain the activation temperature, however, this may be acceptable since the vehicle has not yet been delivered to a customer and since emissions control is less stringent at this time. While the UEGO sensor is slowly heated to the activation temperature, an open-loop fueling control may be used and once the UEGO sensor is activated and capable of measuring exhaust oxygen level, closed loop fuel control may be enabled. During post-delivery phase of the vehicle, when the vehicle is operated for longer durations allowing for adequate warm-up of engine components, a higher voltage resulting in a second, higher current may be applied to the UEGO heater to heat the UEGO sensor element.

Also, the temperature of the UEGO sensor heater element may be feed-back controlled to the set-point temperature with a second, higher, gain in order to expedite UEGO sensor heating such that closed loop fuel control may be enabled within a shorter time after engine start. At this time, expedited sensor heating may be required since the vehicle has been delivered to a customer and since emissions control is more stringent at this time. During conditions when the exhaust temperature is lower than a threshold, spark timing may also be retarded from nominal spark timing to expedite engine exhaust heating such that water in the exhaust system may evaporate instead of condensing on the sensor.

In this way, by using a lower electric current to heat the UEGO sensor element during a pre-delivery phase of the vehicle, the UEGO sensor element may be heated slowly over a longer period of time while at an assembly plant with reduced likelihood of UEGO sensor cracking and degradation. The technical effect of attaining a set-point temperature of the sensor using a lower gain while the vehicle is in the assembly plant is that engine operating parameters may not have to be altered in order to reduce the possibility of UEGO sensor element cracking. In addition to improving fuel economy, vehicle sub-systems tests routinely performed during the pre-delivery phase are not disturbed. In comparison, by transitioning to a higher gain on sensor temperature during the post-delivery phase of the vehicle, UEGO sensor heating may be expedited when the vehicle has left the assembly plant, enabling a faster transition to using feed-back control of engine fueling. This improves fuel economy and emissions performance when the vehicle is with the customer. Overall, by using different values of UEGO heater current during pre-delivery and post-delivery vehicle phases, UEGO sensor activation may be optimized while reducing the possibility of UEGO sensor degradation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for adjusting heating of a UEGO sensor at engine start during each of a pre-delivery and a post-delivery phase of a vehicle having an internal combustion engine. Oxygen sensors may be disposed in an intake air passage or an exhaust gas passage, as shown in the engine system of FIG. 1. FIG. 2 shows a schematic view of an oxygen sensor that may be heated to an activation temperature at engine start. An engine controller may be configured to perform a control routine, such as the example routine of FIG. 3, to adjust the heating of the UEGO sensor differently during a pre-delivery and a post-delivery phase of a vehicle. An example warm-up of the UEGO sensor during each of the pre-delivery phase and the post-delivery phase of a vehicle is shown in FIG. 4.

Figure 1:
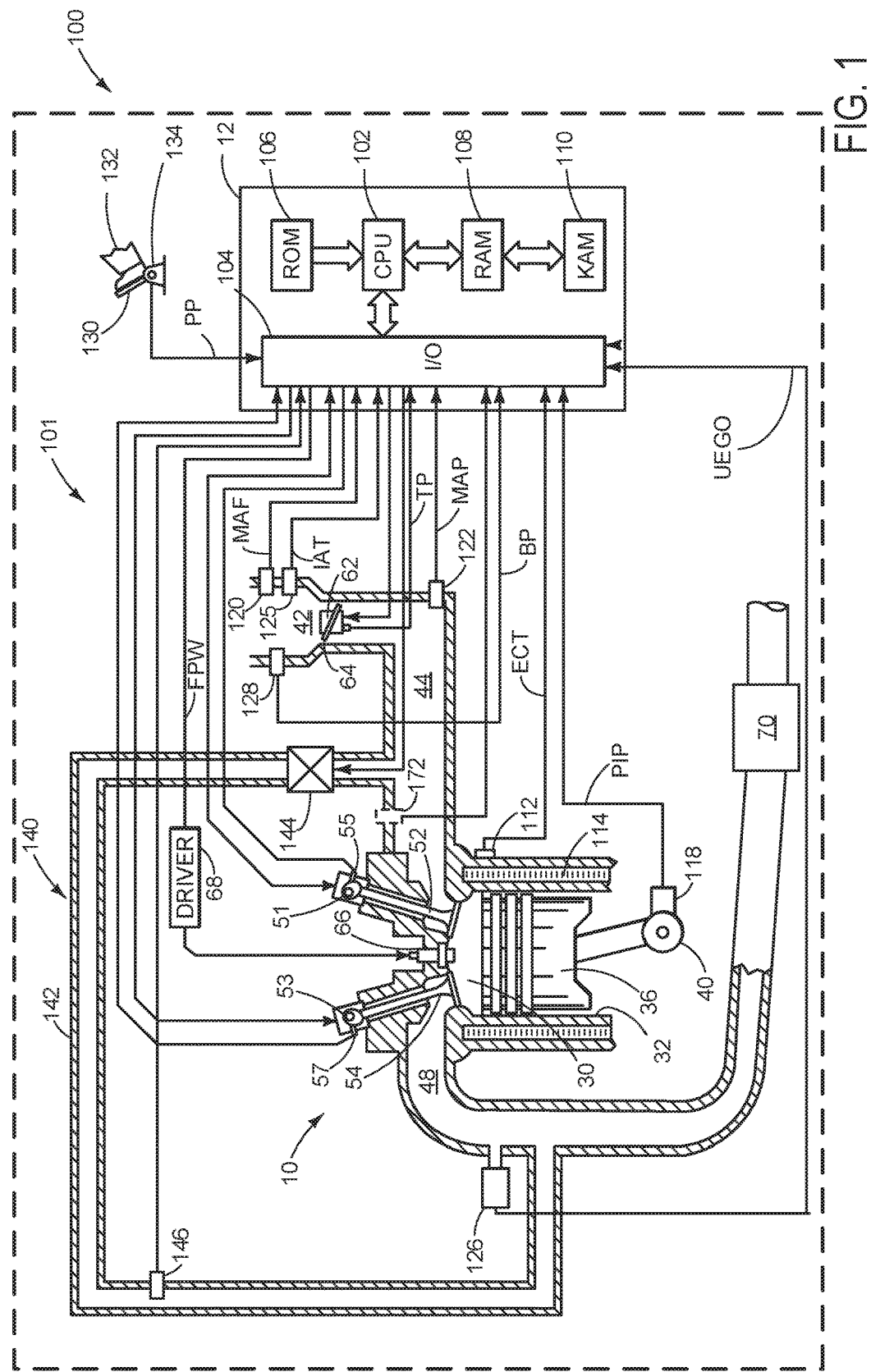
FIG. 1 shows an example engine system including an exhaust oxygen sensor.
Figure 2:
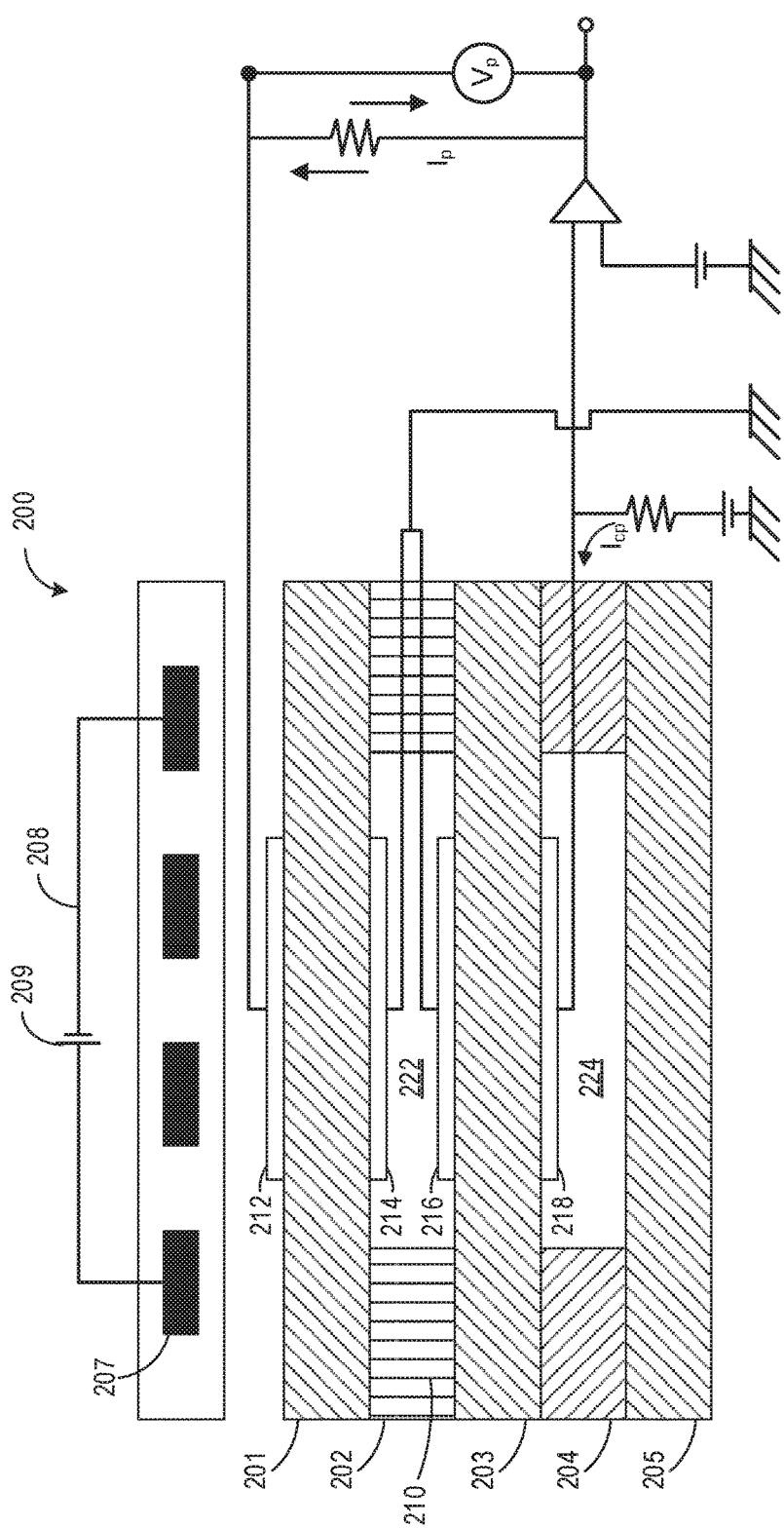
FIG. 2 shows a schematic diagram of an example UEGO sensor.

FIG. 1 is a schematic diagram showing a vehicle system 100 comprising an engine system 101. The vehicle system may be a hybrid vehicle system further comprising an electric motor for operating the vehicle. FIG. 1 shows one cylinder of a multi-cylinder engine 10 in the engine system 101. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some embodiments, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative embodiments, the intake valve 52 and/or exhaust valve 54 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP. The air intake passage 42 may include the intake air temperature (IAT) sensor 125 and the barometric pressure (BP) sensor 128. The IAT sensor 125 estimates intake air temperature to be used in engine operations and provides a signal to the controller 12. Similarly, the BP sensor 128 estimates the ambient pressure for engine operations and provides a signal to the controller 12. The intake passage 42 may further include a mass air flow sensor 120 and a manifold air pressure sensor 122 for providing respective signals MAF and MAP to the controller 12.

An exhaust gas sensor 126 is shown coupled to the exhaust passage 48 upstream of an emission control device 70. The sensor 126 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor. A detailed embodiment of a UEGO sensor is described with reference to FIG. 2. After an engine start, the UEGO sensor may be activated by heating a sensor element to an activation temperature. After activation, the sensor may be used to estimate an exhaust air-fuel ratio (AFR). Based on AFR estimation, engine operating parameters, such as engine fueling and air, may be regulated using a closed loop control with feedback from the sensor. Closed loop control of fueling may result in increased fuel efficiency and emissions quality. Prior to activation of the UEGO sensor, when an accurate AFR estimate is not available, open loop control of fueling may be enabled. Open loop control of fueling may lead to higher than intended fuel usage and emissions levels.

Therefore, it may be desirable to expedite activate the UEGO sensor soon after an engine start so that control of fueling may be transitioned from open loop control to closed loop control as early as possible. In addition, by utilizing an exhaust AFR estimate, diagnostics of engine sensors such as of an emission control device may be improved.

A heater may be coupled to the UEGO sensor for heating the UEGO sensor so that attainment of an activation temperature of the sensor may be expedited, such as during cold-start conditions. However, during a vehicle pre-delivery phase such as when the vehicle assembly may be completed at the assembly plant and the vehicle is ready for on-road travel but is not yet delivered to a customer, the vehicle may be operated frequently and for short durations in the assembly plant and/or at a dealership for purposes such as testing different vehicle components. During such short operations, temperature of a plurality of the engine components may not increase significantly and there may be water present in the exhaust passage. The water may come from the combustion process of from moisture present in the air charge that condenses in the exhaust passage. During the pre-delivery phase, if UEGO sensor heating is expedited without a significant increase in exhaust temperature, cracks may form in the UEGO sensor element due to a sudden temperature gradient causing uneven dimensional changes, degradation of the sensor. Also, condensate collecting in the exhaust passage may collect on the UEGO sensor element, particularly during cold-start conditions when ambient temperatures are low, further increasing the temperature gradient, and enhancing the risk of sensor element cracking. To reduce the risk of sensor element cracking caused by rapid heating of the sensor elements, during the pre-delivery phase, when the vehicles are operated for frequently but for shorter durations, responsive to an engine start, a first, lower voltage resulting in a first, lower electric current may be supplied to the oxygen sensor heater until the oxygen sensor heater reaches a set-point temperature. The electric current supplied to the heater may be adjusted by duty cycling the on/off time (of electric current supply) thereby resulting in different heating rates. The circuit of the oxygen sensor heater may be supplied by a battery and the voltage level may be varied by pulse width modulation (PWM) of the ground circuit. As such, the first, lower electric current may be also supplied to the oxygen sensor heater for a longer duration until the oxygen sensor reaches an activation temperature. The inventors have recognized that in the pre-delivery phase, when the vehicle is still at the assembly plant, emissions control is less stringent, therefore the longer duration for sensor activation may not have any adversely affects. In one example, the set-point temperature of the oxygen sensor heater may be the activation temperature of the oxygen sensor. During the pre-delivery phase, since a lower current is used for heating the UEGO sensor, it may not be required to increase exhaust temperature (such as by retarding spark) before initiating UEGO sensor heating.

However, during post-delivery of the vehicle such as when the vehicle has been delivered to a customer, the emissions control regulations are more stringent and therefore the UEGO sensor is desired to be activated within a short duration. The UEGO sensor activation may be expedited in order to transition from open loop fuel control to closed loop fuel control to achieve improved fuel efficiency and emissions quality. During the vehicle post-delivery phase, responsive to a lower than threshold exhaust temperature, spark timing may be retarded from MBT in order to increase the exhaust temperature to above a threshold temperature. Retarding spark timing during the vehicle post-delivery phase includes retarding spark timing for a number of engine cycles since a first engine cycle following an engine start from rest until the exhaust temperature exceeds the threshold temperature. An amount of spark retard applied during the vehicle post-delivery phase may be based on a measured exhaust temperature relative to the threshold temperature, the amount of spark retard increased as the exhaust temperature falls below the threshold temperature. Once the exhaust temperature reaches the threshold temperature, water condensation on the UEGO sensor decreases (due to evaporation of water), thereby decreasing the possibility of degradation of the UEGO sensor element during sensor warm-up. During the vehicle post-delivery phase, responsive to the engine start, after exhaust temperature exceeds the threshold temperature, in order to warm-up the oxygen sensor, a second, higher electric voltage resulting in a second, higher current may be supplied through the oxygen sensor heater element for a shorter duration.

The emission control device 70 is shown arranged along the exhaust passage 48 downstream of the exhaust gas sensor 126. The device 70 may be a three way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio.

Further, an exhaust gas recirculation (EGR) system 140 may route a desired portion of exhaust gas from the exhaust passage 48 to the intake manifold 44 via an EGR passage 142. The amount of EGR provided to the intake manifold 44 may be varied by the controller 12 via an EGR valve 144. Further, an EGR sensor 146 may be arranged within the EGR passage 142 and may provide an indication of one or more of pressure, temperature, and constituent concentration of the exhaust gas. A linear oxygen sensor 172 may be positioned at the intake passage, downstream of the intake throttle, to facilitate EGR regulation. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The controller 12 is shown in FIG. 1 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of exhaust and intake AFR from oxygen sensors 126 and 172 respectively, inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; and absolute manifold pressure signal, MAP, from the sensor 122. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed. As described above, FIG. 1 shows one cylinder of a multi-cylinder engine, and each cylinder may similarly include its own set of intake/exhaust valves, fuel injector, spark plug, etc.

The controller 12 receives signals from the various sensors of FIG. 1 and employs the various actuators of FIG. 1 to adjust engine operation based on the received signals and instructions stored on a memory of the controller 12. In one example, at engine start, during vehicle pre-delivery phase, the controller may send a signal to actuators of a heater circuit coupled to the exhaust and intake sensors 126 and 172, respectively, to flow a first, lower current through the heater for slowly heating the oxygen sensors. In another example, at engine start, during vehicle post-delivery phase, the controller may send a signal to actuators of heater circuits coupled to the exhaust and intake sensors 126 and 172, respectively, to flow a second, higher current through the heater for expedited heating of the oxygen sensors.

FIG. 2 shows a schematic view of an example embodiment of an exhaust gas oxygen sensor, such as UEGO sensor 200, configured to measure a concentration of oxygen ($O_2$) in an exhaust gas stream during fueling conditions. In one example, UEGO sensor 200 is an embodiment of UEGO sensor 126 of FIG. 1. It will be appreciated, however, that the sensor of FIG. 2 may alternatively represent an intake oxygen sensor, such as sensor 172 of FIG. 1.

Sensor 200 comprises a plurality of layers of one or more ceramic materials arranged in a stacked configuration. In the embodiment of FIG. 2, five ceramic layers (elements) are depicted as layers 201, 202, 203, 204, and 205. These layers include one or more layers of a solid electrolyte capable of conducting ionic oxygen. While the depicted UEGO sensor 200 is formed from five ceramic layers, it will be appreciated that the UEGO sensor may include other suitable numbers of ceramic layers.

Examples of suitable solid electrolytes include, zirconium oxide (also known as Zirconia $ZrO_2$) based materials. $ZrO_2$ is typically white in color. With usage, over time, the two Oxygen atoms may get removed from $ZrO_2$, changing white $ZrO_2$ to dark colored metallic Zirconium (Zr) causing blackening of the corresponding element. Primary causes for blackening to occur may include, but are not limited to, high voltage (in the over-potential region), variable voltage conditions, low air and oxygen conditions. The newly formed Zr not only has ionic conductivity but also is capable of electronic conductivity. The electronic conductivity may increase proportional to the extent of blackening.

The layer 202 includes a porous material or materials creating a diffusion path 210. The diffusion path 210 is configured to introduce exhaust gases into a first internal cavity (also termed as gas detecting cavity) 222 via diffusion. The diffusion path 210 may be configured to allow one or more components of exhaust gases, including but not limited to a desired analyte (e.g., $O_2$), to diffuse into the internal cavity 222 at a more limiting rate than the analyte can be pumped in or out by pumping electrodes pair 212 and 214. In this manner, a stoichiometric level of $O_2$ may be obtained in the first internal cavity 222.

The sensor 200 further includes a second internal cavity 224 within the layer 204 separated from the first internal cavity 222 by the layer 203. The second internal cavity 224 is configured to maintain a constant oxygen partial pressure equivalent to a stoichiometric condition, e.g., an oxygen level present in the second internal cavity 224 is equal to that which the exhaust gas would have if the air-fuel ratio was stoichiometric. The oxygen concentration in the second internal cavity 224 is held constant by pumping voltage $V_{cp}$. Herein, the second internal cavity 224 may be referred to as a reference cell.

A pair of sensing electrodes 216 and 218 is disposed in communication with first internal cavity 222 and the reference cell 224. The sensing electrodes pair 216 and 218 detects a concentration gradient that may develop between the first internal cavity 222 and the reference cell 224 due to an oxygen concentration in the exhaust gas that is higher than or lower than the stoichiometric level. A high oxygen concentration may be caused by a lean intake air or exhaust gas mixture, while a low oxygen concentration may be caused by a rich mixture.

The pair of pumping electrodes 212 and 214 is disposed in communication with the internal cavity 222, and is configured to electrochemically pump a selected gas constituent (e.g., $O_2$) from the internal cavity 222 through the layer 201 and out of the sensor 200. Alternatively, the pair of pumping electrodes 212 and 214 may be configured to electrochemically pump a selected gas through the layer 201 and into the internal cavity 222. Herein, the electrolytic layer 201 together with the pumping electrodes pair 212 and 214 may be referred to as an $O_2$ pumping cell. Also, the electrolytic layer 203 together with the electrodes pair 216 and 218 may be referred to as a Nernst cell (also known as a sensing cell). The electrodes 212, 214, 216, and 218 may be made of various suitable materials. In some embodiments, the electrodes 212, 214, 216, and 218 may be at least partially made of a material that catalyzes the dissociation of molecular oxygen. Examples of such materials include, but are not limited to, electrodes containing platinum and/or gold.

The sensing cell (Nernst cell) may passively measure the oxygen concentration in the first internal (gas detection) cavity 222. The pumping cell may adjust the oxygen concentration in the cavity 222 based on feed-back from the sensing cell. An external comparator circuit may compare the voltage generated by the sensing cell to a reference voltage $V_p$. In one example, under normal operating conditions, the reference voltage $V_p$ may be 450 mV. The voltage generated across a Nernst cell with one electrode exposed to air (with ~20% oxygen concentration) and the other electrode exposed to a low oxygen concentration (~10 ppm oxygen) may be around 450 mV. This oxygen concentration (~10 ppm) may correspond to stoichiometry. If the oxygen concentration in the cavity 222 is less than the oxygen concentration corresponding to stoichiometry (~10 ppm) due to reductants such as carbon monoxide or hydrogen, the comparator circuit may send a signal to the pumping cell to pump oxygen into the cavity 222 from the exhaust. The oxygen will react with the reductants thus raising the oxygen concentration level until the level reaches the oxygen concentration corresponding to stoichiometry (~10 ppm) as measured by the sensing (Nernst) cell. The amount of all of these reductants in the cavity determines how much oxygen needs to be pumped into the cavity by the pumping cell to completely react. The pumping current $I_p$ is directly proportional to the oxygen concentration in the pumping cell. The amount oxygen pumped is just enough to completely react with all the reductants. The sensor may employ different techniques to determine the concentration of reductants. In one example, the pumping current which is proportional to the oxygen concentration in the pumping cell may be used to estimate the reductant concentration.

If the oxygen concentration in the cavity is greater than the oxygen concentration corresponding to stoichiometry (~10 ppm), a reverse method may take place. The sensing cell may measure a voltage less than the reference voltage $V_p$ (450 mV) and the comparator circuit may send a signal to the pumping cell to pump oxygen out of the cavity by applying a pumping current $I_p$ in the opposite direction. The pumping current $I_p$ is directly proportional to the amount of oxygen that is pumped out of the cell, which is in turn is directly proportional to the amount of oxygen diffusing into the cavity 222. This amount of oxygen may be directly proportional to the concentration of oxygen in the exhaust gas.

A heater 207 may be disposed in thermal communication with the sensor elements (such as ceramic layers 201, 202, 203, 204, and 205) to increase and maintain the temperature of the layers to above an activation temperature in order to achieve an increase in the ionic conductivity of the layers. Due to the increased ionic conductivity of the layers, the UEGO sensor may effectively estimate the oxygen content in the exhaust gas via the abovementioned process. The heater may include an electrical circuit 208 with a power source 209 and a switch. Upon closing the switch, an electric current from the power source 209 may be circulated through the circuit 208 in order to heat the sensor elements. In response to a vehicle key-on event during a vehicle pre-delivery phase at an assembly plant, independent of the exhaust temperature, a first, lower voltage may be applied to the electric circuit of the heater to flow a first, lower current may be routed through the electric circuit of the heater and a first, lower gain may be set for feedback controlling an inferred heater temperature to a set-point temperature. The first, lower electric current is flowed through the electric circuit of the heater for a first, longer duration until the sensor elements reach the activation temperature. As the heating is carried out slowly and over a longer duration of time, possibility of cranking of the elements may reduce.

In response to a vehicle key-on event, during a vehicle post-delivery phase outside the assembly plant, once the exhaust temperature increase to above a threshold temperature, a first, lower voltage may be applied to the electric circuit of the heater to flow a second, higher current through the electric circuit of the heater and a second, higher gain may be set for feedback controlling the inferred heater temperature to the set-point temperature. The second, higher electric current is flowed through the electric circuit of the heater for a second, shorter duration until the elements reach the activation temperature. By, heating the UEGO sensor elements using the second, higher current after the increase in exhaust temperature to the threshold temperature, possibility of water condensation leading to cranking of the elements may be reduced.

It should be appreciated that the oxygen sensor described herein is merely an example embodiment of a UEGO sensor, and that other embodiments of intake or exhaust oxygen sensors may have additional and/or alternative features and/or designs.

In this way, the systems of FIGS. 1 and 2 enable a system for a vehicle comprising a vehicle, an engine including a cylinder, an exhaust system including an exhaust catalyst, an exhaust temperature sensor, an oxygen sensor, and a heater including an electric circuit with a power source and a switch coupled to the oxygen sensor, a spark plug coupled to the cylinder, a controller with computer readable instructions stored on non-transitory memory for: in response to a vehicle key-on event during a vehicle pre-delivery phase at an assembly plant, applying a first calibration for heating the oxygen sensor to an activation temperature by applying a first, lower voltage to the electric circuit of the heater to flow a first, lower current through the electric circuit of the heater and by setting a first, lower gain for feedback control of an inferred heater temperature to a set-point temperature; and in response to a vehicle key-on event during a vehicle post-delivery phase outside the assembly plant, applying a second calibration for heating the oxygen sensor to an activation temperature applying a second, higher voltage to the electric circuit of the heater to flow a second, higher current through the electric circuit of the heater and by setting a second, higher gain for feedback control of the inferred heater temperature to the set-point temperature.

Figure 3:
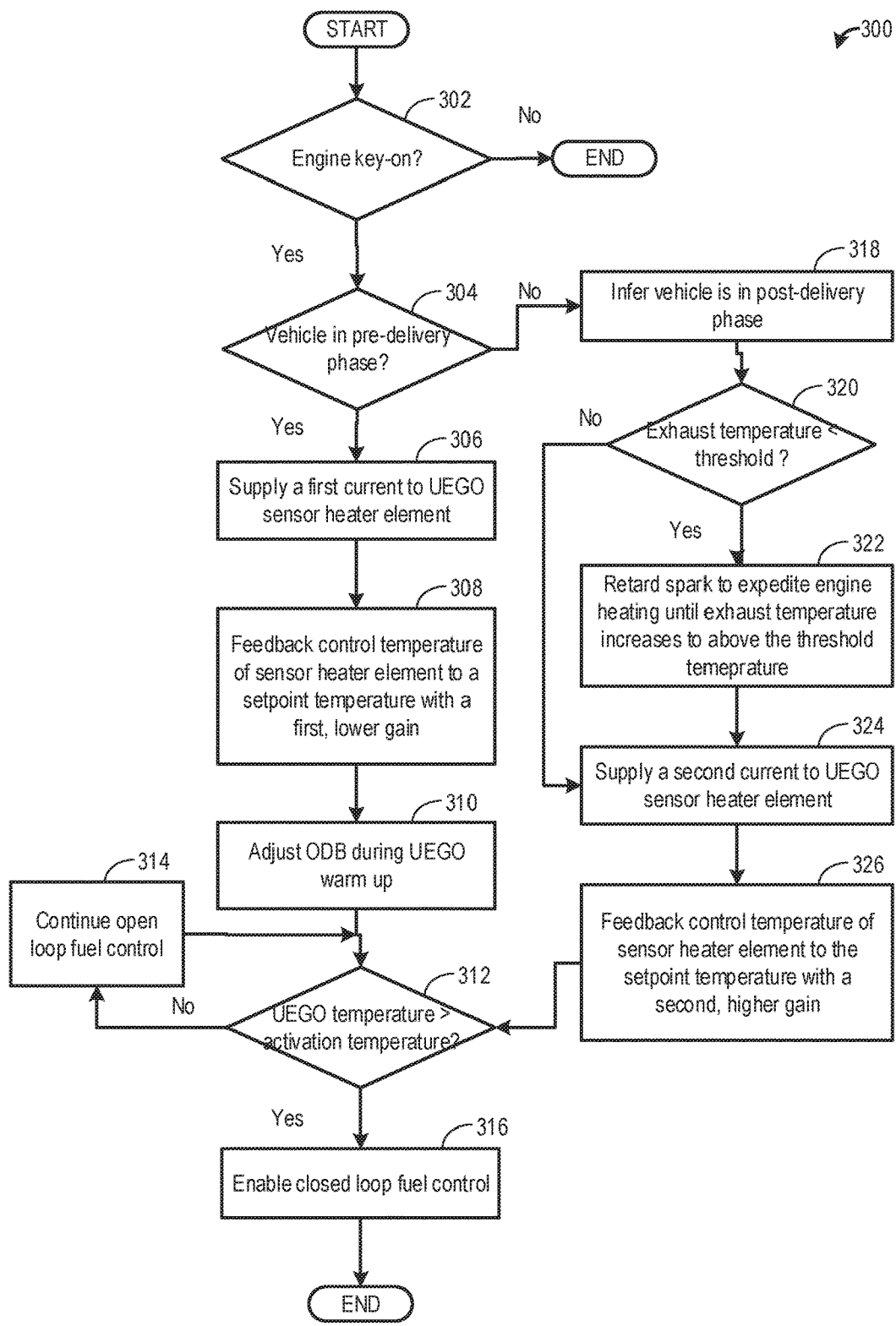
FIG. 3 shows a flow chart illustrating an example method that can be implemented to adjust heating of a UEGO sensor during each of a pre-delivery and a post-delivery phase of a vehicle.
Figure 4:
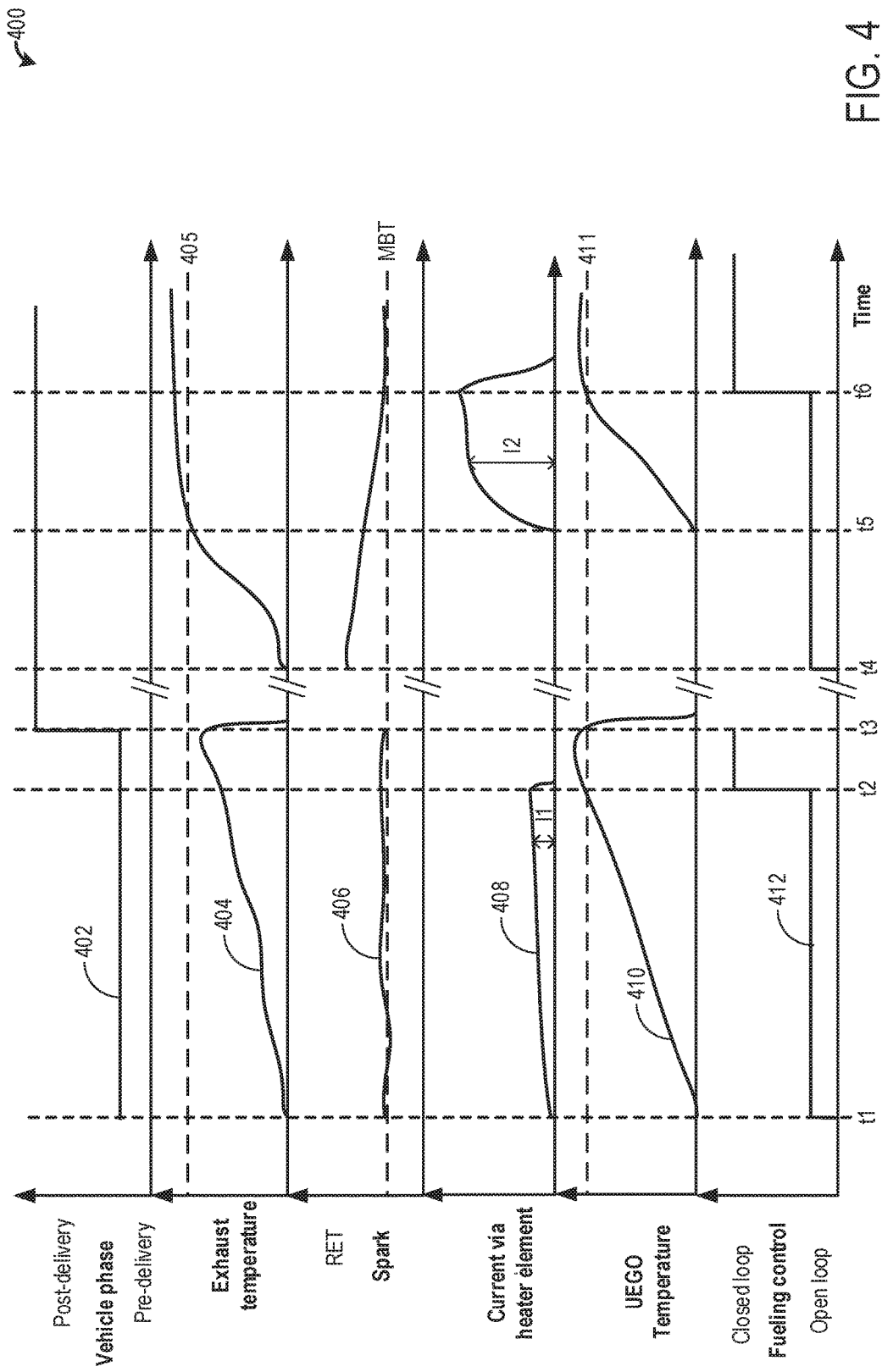
FIG. 4 shows an example of warm-up of a UEGO sensor during pre-delivery and post-delivery phase of a vehicle, according to the present disclosure.

FIG. 3 shows an example method 300 for adjusting heating of a UEGO sensor during each of a pre-delivery and a post-delivery phase of a vehicle. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, the routine may include determining if a vehicle key-on event is detected. For example, it may be determined that the vehicle operator has expressed intent to start vehicle operation. As such, by confirming a vehicle key-on event, an upcoming vehicle drive cycle is indicated. While referred to herein as a vehicle "key-on" event, it will be appreciated that the operator may indicate intent to operate the vehicle with or without the use of a key. For example, vehicle operation may be initiated by inserting a key (active key) into an ignition slot and moving the slot to an "ON" position. Alternatively, vehicle operation may be initiated when a key (passive key) is within a threshold distance of the vehicle (e.g., in the vehicle). As another example, vehicle operation may be initiated when the operator presses an ignition button to an "ON" position. Still other approaches may be used by an operator to indicate intent to operate the vehicle. As such, vehicle operator driving patterns may only be learned when the vehicle is operating. Thus, if a vehicle key-on event, and therefore an upcoming vehicle drive cycle, is not confirmed, the method may end and UEGO sensor may not be carried out.

If a key-on event is confirmed, at 304, the routine includes determining if the vehicle is in a pre-delivery phase. In the pre-delivery phase, the vehicle assembly may be completed at the assembly plant and the vehicle may be ready for on-road travel but is not yet delivered to a customer. In one example, a pre-delivery phase (green engine condition) may be determined based on a number of key-on events that have elapsed as well as a duration of each key-on event (that is, a duration elapsed between key-on and key-off for each key-on event). For example, the engine may be a green engine on a drive cycle after a first green engine start (or a number of engine starts after the first green engine start)

following vehicle assembly and before the vehicle leaves the assembly plant. As such, while the engine is still a green engine, various tests may be performed on the engine to assess engine component function. In addition, various functions may be diagnosed, such as emissions compliance, leak detection, etc., by moving the vehicle from one station to another station at the assembly plant.

One example of determining if a vehicle is in a pre-delivery phase based on a number of key-on events may include determining whether a specified engine run time has elapsed since an initial key-on event following vehicle assembly. A green engine condition may be confirmed during an initial key-on event, and for a further number of key-on events that occur within the engine run time since the initial key-on event. As another example, a green engine condition may be confirmed based on an integrated value of a number of key-on events since the initial key-on event, and a duration of each of the number of key-on events. If the integrated value is less than a threshold duration, the engine may be in a green condition. After the threshold duration, the engine may be determined to be in a non-green condition. As such, it is expected that by the threshold duration, or the threshold number of key-on events, the vehicle encompassing the engine has left the assembly plant and has been delivered to a customer/operator (that is, the engine is in a post-delivery state). In an alternate example, it may be determined if a threshold number of miles has been driven since the first key-on event following vehicle assembly. Vehicle operations in the pre-delivery phase may be frequent but of shorter durations. In the pre-delivery phase a first calibration (set of methods) may be used for activation and diagnostics of a plurality of engine components.

If it is confirmed that the vehicle is in the pre-delivery phase, the first calibration may be used for activation of a UEGO sensor coupled to the engine exhaust (and/or intake) passage. At 306, in order to increase the temperature of an UEGO sensor at engine start, a first current may be supplied to the UEGO sensor heating element. In one example, electric current may be supplied to the UEGO sensor heating element via a battery of voltage 12V. By carrying out pulse width modulations of the ground circuit, the voltage level applied to the UEGO sensor heating element may be adjusted. Duty cycling the on/off time of the electric current supply results in different heating rates of the UEGO heating element. The relation between electric current and voltage is given by Ohms law as shown in equation 1 and the power delivered is shown in equation 2.

$$V = I \times R \quad (1)$$

$$P = I \times V \quad (2)$$

Where, V is the voltage supplied to the UEGO sensor heating element via the battery, R is the resistance of the UEGO sensor heating element, I is the electric current flowing through the UEGO sensor heating element, and P is the power delivered to the heating element. In one example, the resistance R may be 14 ohms and in the pre-delivery phase, a voltage of 3V may be supplied to the heating element.

The temperature of the UEGO sensor is required to be increased to an activation temperature in order to activate the sensor. During the pre-delivery phase, since the vehicle may be operated for shorter durations, the engine may not be sufficiently heated during the drive cycle, thereby increasing the requirement of using the UEGO sensor heater for increasing the sensor temperature. Due to the lower exhaust temperature, especially during cold-start conditions, water from the combustion chamber and the intake air charge may condense on the UEGO sensor which may cause cracks in the sensor elements. In order to reduce the possibility of the UEGO sensor element cracking during lower than threshold exhaust temperatures, a first current of lower magnitude may be routed through the sensor heater to heat the sensor over a longer time period. Before the sensor reaches the activation temperature, the sensor may not be effectively used to measure exhaust air fuel ratio. Therefore, during this time, fueling may be adjusted via an open loop control.

At 308, the temperature of the UEGO sensor heater element may be feed-back controlled to a set-point temperature with first, lower gain. In one example, the lower gain may be based on an exhaust temperature as estimated via an exhaust temperature sensor coupled to the exhaust passage. The controller may determine the first gain through a determination that directly takes into exhaust temperature, such as decreasing the first gain with a decrease in exhaust temperature. The controller may alternatively determine the first gain based on a calculation using a look-up table with the input being the exhaust temperature and the output being the first gain. The controller may then send a signal to a power source of the UEGO sensor heater to increase the electric current supplied through the heater circuit based on the first gain. Due to the lower gain used, the rate of increase of current in the UEGO sensor heater circuit may be lower. By heating the sensor slowly until the activation temperature is reached, possibility of cracks forming in the UEGO sensor elements may be reduced. If the UEGO sensor is heated at a faster rate while the exhaust temperature is lower than a threshold, water may condense on the UEGO sensor elements and cracks may form in the UEGO sensor elements due to sudden changes in temperature causing expansion and contraction of the elements. Due to the slower heating, the condensate formed on the sensor may not cause sudden changes in the dimensions of the sensor elements thereby reducing degradation in the sensor elements. In one example, the gain for the feed-back control of temperature of the UEGO sensor heater element may be set at zero and a constant lower electric current may be routed via the UEGO sensor heater.

At 310, on-board diagnostics (OBD) during the UEGO sensor warm up period may be adjusted to account for the longer duration of the inactivity of the UEGO sensor. Due to the supply of lower electric current and the application of a lower gain, heating of the UEGO sensor is carried our less aggressively and the engine may be operated for a longer duration using open loop fueling control. As such, until the oxygen sensor temperature increases to above the threshold temperature, an engine component may be diagnosed independent of an output of the oxygen sensor, and after the oxygen sensor temperature increases to above the threshold temperature, the engine component may be diagnosed based on the output of the oxygen sensor. In one example, while a temperature of the oxygen sensor is below the oxygen sensor activation temperature, exhaust catalyst activity may be estimated based on each of an exhaust temperature, an engine speed, an engine load, and an engine temperature, the exhaust catalyst activity estimated independent of an exhaust oxygen content estimated by the oxygen sensor, and after the temperature of the oxygen sensor heater element is above the oxygen sensor activation temperature, the exhaust catalyst activity may be based on each of the exhaust oxygen content, the exhaust temperature, the engine speed, the engine load, and the engine temperature. In another example, the exhaust catalyst activity may not be estimated immediately after an engine start and the monitoring of catalyst activity may be initiated after activation of the UEGO sensor.

At 312, the routine includes determining if the UEGO temperature is above the activation temperature. As the UEGO sensor temperature increases to above the activation temperature, the sensor may be optimally functional and may be able to estimate exhaust oxygen content accurately and reliably. If it is determined that the UEGO sensor temperature is below the activation temperature, the sensor may continue to be heated. As the UEGO sensor is not activated and is not able to reliably measure exhaust oxygen content, exhaust air fuel ratio may not be estimated, therefore, at 314, the engine may be operated with open loop fuel control.

If it is determined that the UEGO sensor temperature is higher than the activation temperature, it may be inferred that the UEGO sensor can be effectively used to estimate exhaust air fuel ratio. Consequently at 316, closed loop fuel control may be enabled. In the closed loop control, the sensed exhaust air fuel ratio may be used to determine the amount of fuel to be injected (pulse-width of fuel injection) in the immediately subsequent engine cycle so as to provide a target air-fuel ratio (e.g. stoichiometric). By enabling closed loop fuel control, an optimal amount of fuel may be injected during each engine cycle, thereby improving fuel efficiency and emissions quality.

If at 304 it is determined that the vehicle is not in the pre-delivery phase, at 318, it may be inferred that the vehicle is in a post-delivery phase. In this phase, the vehicle may no longer be operated in the assembly plant or at the dealership and may be operated by the driver for longer trips. In one example, once a vehicle is transferred to a customer at the dealership, a technician may change the settings for activation and diagnostics of a plurality of engine components from the first calibration method (as used during the pre-delivery mode) to a second calibration method that may be used for activation and diagnostics in the post-delivery mode. In another example, once the vehicle has traveled a threshold number of miles, the settings for activation and diagnostics of the plurality of engine components may be changed from the first calibration method to the second calibration method. In yet another example, once the vehicle has been started more than a threshold number of times, the settings for activation and diagnostics of the plurality of engine components may be changed from the first calibration method to the second calibration method. Once it is inferred that the vehicle is in the post-delivery phase, the second calibration may be used for UEGO sensor activation. In this way, transition from the first calibration method used in the vehicle pre-delivery phase to the second calibration method used in the vehicle post-delivery phase may be carried out responsive to one or more of a total number of miles travelled by the vehicle increasing to above a threshold number of miles and an integrated value determined as a function of a number of engine start events since assembly of the vehicle and a duration of each of the number of engine start events increasing to above a threshold value.

At 320, the routine includes determining if the exhaust temperature, as estimated via an exhaust temperature sensor, is higher than a threshold. The threshold may correspond to an exhaust temperature above which water may no longer condense on the UEGO sensor elements, thereby reducing the possibility of cracks occurring during the warm-up time of the UEGO sensor. As an example, exhaust temperature may be below the threshold temperature during cold-start conditions.

If it is determined that the exhaust temperature is lower than the threshold, at 322, the controller may send a signal to an actuator coupled to the spark plug of each engine cylinder to retard spark in order to expedite engine heating. For example, spark timing may be retarded from maximum break torque (MBT) timing. As spark is retarded, the entire air fuel mixture may not be combusted in the cylinder and the unburnt portion of the mixture may burn in the exhaust passage causing release of heat in the exhaust passage. The degree of spark retard and the duration for which spark may be retarded may be based on the exhaust temperature. In one example, the controller may increase the degree of spark retard with a decrease in exhaust temperature. In another example, the controller may increase the duration of engine operation with spark retard (number of engine cycles with spark retard) with a decrease in exhaust temperature. The engine may be operated with retarded spark for a number of engine cycles since a first engine cycle following an engine start from rest until the exhaust temperature increases to above the threshold temperature. Once the exhaust temperature increases to above the threshold temperature, spark timing may be returned to the nominal timing (such as MBT).

Once the exhaust temperature increases to above the threshold temperature, at 324, in order to increase the temperature of an UEGO sensor to the activation temperature, a second current (generated by adjusting the voltage supplied to the heating element) may be supplied to the UEGO sensor heating element. In one example, the resistance R may be 14 ohms and in the post-delivery phase, a voltage of 5V may be initially supplied to the heating element. Once the UEGO sensor temperature increases above a threshold when further water condensation on the UEGO sensor may not take place, the voltage supplied to the heating element may be increased to 12 V. Further, feedback temperature from the UEGO sensor may be used to adjust the voltage to produce a desired temperature at the UEGO sensor.

If at 320 it is determined that the exhaust temperature is higher than the threshold temperature (such as during a hot-start), the routine may directly proceed to step 324. As such, during a hot start, while in the vehicle is operated in the post-delivery phase, the engine may be operated with spark timing at the nominal timing independent of the exhaust temperature. The second current supplied to the UEGO sensor heater in the post-delivery phase of the vehicle may be higher than the first current supplied to the UEGO sensor heater during the pre-delivery phase of the vehicle. By increasing the exhaust temperature to above the threshold temperature before applying the second current to the UEGO sensor heater for the UEGO sensor warm-up, the possibility of water condensation on the sensor may be reduced, thereby reducing the possibility of cracks forming on the sensor elements.

At 326, the temperature of the UEGO sensor heater element may be feed-back controlled to a set-point temperature with a second, higher gain. The second gain used in the feed-back control during the post-delivery phase may be higher than the first gain used in the feed-back control during the pre-delivery phase. Due to the higher gain used, the rate of increase of current in the UEGO sensor heater circuit may be higher. As the heater reaches the set-point temperature within a short time (due to more aggressive temperature increase caused by the higher gain), the UEGO sensor may be heated to the activation temperature at a higher heating rate. By using a higher heating rate for heating the UEGO sensor, sensor activation may be expedited. During sensor warm-up open loop fuel control may be used. The routine may then proceed to step 312 wherein it may be determined if the UEGO sensor has reached its activation temperature and is optimally functional.

In this way, during a first engine start while a vehicle is operated in an assembly plant, an engine may be operated with spark at a nominal timing and with a first, lower electric current flowing through an oxygen sensor heater until a temperature of the oxygen sensor reaches a threshold temperature, wherein the first start includes a hot-start or a cold-start of the engine; and during a second engine cold-start while the vehicle is operated outside the assembly plant, the engine may be operated with spark timing retarded from the nominal timing until an exhaust temperature exceeds a threshold exhaust temperature, and then flowing a second, higher electric current through the oxygen sensor heater until the oxygen sensor temperature reaches the threshold temperature.

FIG. 4 shows an example operating sequence 400 illustrating warm-up the UEGO sensor during each of the pre-delivery phase and the post-delivery phase. The horizontal (x-axis) denotes time and the vertical markers t1-t6 identify significant times in each of the pre-delivery and post-delivery phase of the vehicle.

The first plot, line 402, shows a vehicle phase. Once a vehicle is delivered to a customer (operator) at a dealership, the vehicle is in the post-delivery phase. Before the delivery, when the vehicle is in the assembly plant or at a dealership, the vehicle is in the pre-delivery phase. The second plot, line 404, shows variation in exhaust temperature over time. Dotted line 405 denotes a threshold exhaust temperature above which water from combustion may evaporate in the exhaust passage and therefore condensate may not form on the UEGO sensor. The third plot, line 406, shows a spark timing relative to maximum break torque (MBT) timing. The fourth plot, line 408, shows the magnitude of electric current flowing through a circuit of a heater coupled to the UEGO sensor elements. The fifth plot, line 410, shows change in UEGO sensor temperature over time. Dotted line 411 denotes an activation temperature above which the UEGO sensor is optimally functional. The sixth plot, line 412, shows open loop and closed loop fueling control.

Prior to time t1, the engine is shut down and the engine is not operated to propel the vehicle. During this time, the engine sensors including the UEGO sensor may not be in an active (operational) state. At time t1, in response to an operator torque demand, the engine starts from rest after a period of inactivity. At the time of the engine start, the engine exhaust temperature is lower than the threshold temperature 405 and the temperature of the UEGO sensor is lower than the activation temperature 411. At this time, the vehicle is in the pre-delivery mode and a first calibration is used for activation of engine sensors such as the UEGO sensor.

Between time t1 to t2, an electric current of lower magnitude I1 is supplied to the heater coupled to the UEGO sensor for heating the sensor elements. In order to supply the electric current, the controller actuates a switch coupled to the heater circuit to a closed position, enabling current flow through the heater. A smaller gain may be used to feed-back control the temperature of the UEGO sensor heater to a set-point temperature. Due to the smaller gain used for temperature control, the current flowing through the heater element is seen to increase at a lower rate between time t1 and t2. Consequently, the rate of increase in UEGO temperature is also lower. During this time, the exhaust temperature increase steadily but continues to remain below the threshold 405. Since, at this time, the vehicle is in the pre-delivery phase and other system diagnostics may be carried out during this time, engine operating conditions are not modified to increase the exhaust temperature and spark is maintained at MBT. Due to the lower than threshold exhaust temperature, between time t1 and t2, water may condense on the UEGO elements. By increasing the UEGO sensor temperature at a lower rate, possibility of formation of cracks in the UEGO elements due to sudden temperature changes (causing faster expansion and contraction) is reduced. Between time t1 and t2, since the UEGO sensor temperature is below the activation temperature, the sensor is not used to estimate exhaust air fuel ratio. Therefore, fueling is controlled via an open-loop.

At time t2, it is observed that the temperature of the UEGO sensor has increased to the activation temperature 411. Based on the UEGO sensor temperature reaching the activation temperature 411, it may be inferred that the UEGO sensor is activated and further heating of the sensor is not desired. Consequently, the current flowing via the heater coupled to the UEGO sensor is reduced to zero by actuating a switch in the heater circuit to an open position. Upon activation of the UEGO sensor, between time t2 and t3, air fuel ratio is accurately estimated and fueling control may be transitioned from the open loop control to a closed loop control. In the closed loop control the estimated air fuel ratio is used for feed-back controlling the amount of fuel to be injected in the subsequent engine cycle.

At time t3, the vehicle is delivered to a customer and the echelle enters the post-delivery phase. A technician at the dealership changes the settings for calibration of engine sensors from the first set to a second set. Between time t3 and t4, the engine is shut down and is not operated to propel the vehicle. During this time, the temperature of the UEGO sensor reduces to below the activation temperature 411. At time t4, in response to an operator torque demand, the engine restarts from rest. At this time, the vehicle is in the post-delivery mode and expedited heating the UEGO sensor is desired in order to transition engine operation from the open loop fuel control to closed loop fuel control.

At time t4, it may be inferred that the exhaust temperature is below the threshold 405 which may cause condensate formation on the UEGO sensor elements. Therefore, in order to reduce the possibility of the UEGO sensor cracking due to sudden temperature changes, the exhaust temperature is desired to be increased to above the threshold 405 before expedited heating of the UEGO sensor is initiated. In order to increase exhaust temperature, between time t4 and t5 spark may be retarded from MBT. As spark is retarded, a portion of the air fuel mixture in the combustion chamber may remain uncombusted and this remaining mixture may burn in the exhaust passage causing a rapid increase in exhaust temperature.

At time t5, it is inferred that the exhaust temperature is above the threshold 405 and spark may be resumed at MBT. Between time t5 to t6, an electric current I2 is supplied to the heater coupled to the UEGO sensor for heating the sensor elements. In order to supply the electric current, the controller actuates the switch coupled to the heater circuit to a closed position, enabling current flow through the heater. A larger gain is used to feed-back control the temperature of the UEGO sensor heater to a set-point temperature. The current supplied for UEGO sensor heating (I1) and the gain used for feed-back controlling the heater temperature during the pre-delivery phase are lower than the current supplied for UEGO sensor heating (I2) and the gain used for feed-back controlling the heater temperature during the post-delivery phase, respectively. Due to the larger gain used for temperature control, the rate of increase in current flowing through the heater element is seen to increase at a higher rate between time t5 and t6. Consequently, the rate of increase in UEGO temperature is expedited.

At time t6, it is observed that the temperature of the UEGO sensor has increased to the activation temperature 411. Based on the UEGO sensor temperature reaching the activation temperature 411, it may be inferred that the UEGO sensor is activated and further heating of the sensor is not desired. Consequently, the controller actuates the switch in the heater circuit to an open position to suspend electric current flow via the heater element. In this way, after increasing the exhaust temperature and then by using a higher electric current, the UEGO sensor is heated to the activation temperature within a shorter duration compared to the time required to heat the UEGO sensor using a lower current during the pre-delivery mode. However, for heating the exhaust, engine operating conditions such as spark timing had to be ratarded which may have increased fuel consumption. Upon activation of the UEGO sensor, after time t6, air fuel ratio is accurately estimated and fueling control may be transitioned from the open loop control to a closed loop control.

In this way, by using a lower gain to attain a set-point temperature of the UEGO sensor heater during the pre-delivery phase, the UEGO sensor may be heated over a longer time period with reduced possibility of UEGO sensor cracking due to sudden change in sensor temperature. The technical effect of using a lower electric current to attain the UEGO activation temperature is that engine operating parameters may not have to be altered prior to UEGO sensor heating and also the possibility of UEGO sensor element cracking due to formation of condensate on the sensor elements may be reduced. During the post-delivery phase of the vehicle, by transitioning to using a higher gain on sensor temperature, UEGO sensor heating may be expedited, thereby lowering the duration of engine operation using open loop fuel control. Overall, by using calibration techniques for UEGO sensor heating during pre-delivery and post-delivery vehicle phases, UEGO sensor activation may be optimized while reducing the possibility of UEGO sensor degradation.

An example method comprises: during a vehicle pre-delivery phase, feed-back controlling an oxygen sensor heater element to a set-point temperature with a first, lower gain; and during a vehicle post-delivery phase, feed-back controlling the oxygen sensor heater element to the set-point temperature with a second, higher gain. Any preceding example further comprises, additionally or optionally, during the vehicle pre-delivery phase, maintaining spark timing independent of exhaust temperature, and during the vehicle post-delivery phase, responsive to a lower than threshold exhaust temperature, retarding spark timing from maximum brake torque. In any or all of the preceding examples, additionally or optionally, retarding spark timing during the vehicle post-delivery phase includes retarding spark timing for a number of engine cycles since a first engine cycle following an engine start from rest until the exhaust temperature exceeds the threshold temperature. In any or all of the preceding examples, additionally or optionally, an amount of spark retard applied during the vehicle post-delivery phase is based on a measured exhaust temperature relative to the threshold temperature, the amount of spark retard increased as the exhaust temperature falls below the threshold temperature. Any or all of the preceding examples further comprising, additionally or optionally, during the vehicle pre-delivery phase, responsive to the engine start, supplying a first, lower electric voltage resulting in a first, lower current to the oxygen sensor heater, and during the vehicle post-delivery phase, responsive to the engine start, after exhaust temperature exceeds the threshold temperature, supplying a second, higher electric voltage resulting in a second, higher current through the oxygen sensor heater element. Any or all of the preceding examples further comprising, additionally or optionally, during the vehicle pre-delivery phase, supplying the first, lower electric current through the oxygen sensor heater element until the set-point temperature is reached, and during the vehicle post-delivery phase, supplying the second, higher electric current through the oxygen sensor heater element until the set-point temperature is reached. In any or all of the preceding examples, additionally or optionally, the oxygen sensor heater element is coupled to an exhaust oxygen sensor, wherein the set-point temperature includes an oxygen sensor activation temperature, the method further comprising, during the vehicle pre-delivery phase, while a temperature of the oxygen sensor is below the oxygen sensor activation temperature, estimating exhaust catalyst activity based on each of an exhaust temperature, an engine speed, an engine load, and an engine temperature, the exhaust catalyst activity estimated independent of an exhaust oxygen content estimated by the oxygen sensor, and after the temperature of the oxygen sensor heater element is above the oxygen sensor activation temperature, estimating exhaust catalyst activity based on each of the exhaust oxygen content, the exhaust temperature, the engine speed, the engine load, and the engine temperature. Any or all of the preceding examples further comprising, additionally or optionally, during the vehicle pre-delivery phase, while the temperature of the oxygen sensor is below the oxygen sensor activation temperature, adjusting engine fueling via open-loop control, and after the temperature of the oxygen sensor is above the oxygen sensor activation temperature, transitioning to fueling the engine via closed-loop control. In any or all of the preceding examples, additionally or optionally, the vehicle pre-delivery phase includes the vehicle being operated in an assembly plant and wherein the vehicle post-delivery phase includes the vehicle being operated outside the assembly plant.

Another example method comprises: during a first engine start while a vehicle is operated in an assembly plant, operating an engine with spark at a nominal timing and with a first, lower electric current flowing through an oxygen sensor heater until a temperature of the oxygen sensor reaches a threshold temperature, wherein the first start includes a hot-start and a cold-start of the engine, and during a second engine cold-start while the vehicle is operated outside the assembly plant, operating the engine with spark timing retarded from the nominal timing until an exhaust temperature exceeds a threshold exhaust temperature, and then flowing a second, higher electric current through the oxygen sensor heater until the oxygen sensor temperature reaches the threshold temperature. Any of the preceding examples further comprising, additionally or optionally, during a second engine hot start while in the vehicle is operated in the post-delivery phase, operating the engine with spark timing at the nominal timing independent of the exhaust temperature and flowing the second, higher electric current through the oxygen sensor heater until the oxygen sensor temperature reaches the threshold temperature. Any or all of the preceding examples further comprising, additionally or optionally, during the second engine cold-start, for a first engine cycle and a number of engine cycles thereafter, operating the engine with spark timing retarded from the nominal timing until the exhaust temperature reaches the threshold exhaust temperature, and then resuming spark timing at the nominal timing. In any or all of the preceding examples, additionally or optionally, during the first engine start, the voltage applied to the oxygen sensor is adjusted to flow the first, lower electric current through the oxygen sensor heater for a first, longer duration, and wherein during the second engine hot-start and cold-start, the voltage applied to the oxygen sensor is adjusted to flow the second, higher electric current through the oxygen sensor heater for a second, shorter duration. In any or all of the preceding examples, additionally or optionally, during the second engine cold-start, an amount of spark retard applied is based on sensed exhaust temperature, the amount of spark retard increased as the sensed exhaust temperature falls below the threshold exhaust temperature. Any or all of the preceding examples further comprising, additionally or optionally, during the first engine start, applying a first, lower, gain to feedback control of a temperature of the oxygen sensor heater to a set-point temperature, and during the second engine cold-start and hot-start, applying a second, higher gain to feedback control the temperature of the oxygen sensor heater responsive to the set-point temperature. In any or all of the preceding examples, additionally or optionally, until the oxygen sensor temperature increases to above the threshold temperature, diagnosing an engine component independent of an output of the oxygen sensor, and after the oxygen sensor temperature increases to above the threshold temperature, diagnosing the engine component based on the output of the oxygen sensor.

In yet another example, a vehicle system comprises: a vehicle, an engine including a cylinder, an exhaust system including an exhaust catalyst, an exhaust temperature sensor, an oxygen sensor, and a heater including an electric circuit with a power source and a switch coupled to the oxygen sensor, a spark plug coupled to the cylinder, a controller with computer readable instructions stored on non-transitory memory for: in response to a vehicle key-on event during a vehicle pre-delivery phase at an assembly plant, applying a first calibration for heating the oxygen sensor to an activation temperature by applying a first, lower voltage to the electric circuit of the heater to flow a first, lower current through the electric circuit of the heater and by setting a first, lower gain for feedback control of an inferred heater temperature to a set-point temperature; and in response to a vehicle key-on event during a vehicle post-delivery phase outside the assembly plant, applying a second calibration for heating the oxygen sensor to an activation temperature applying a second, higher voltage to the electric circuit of the heater to flow a second, higher current through the electric circuit of the heater and by setting a second, higher gain for feedback control of the inferred heater temperature to the set-point temperature. In any preceding example, additionally or optionally, during the first calibration, the first, lower electric current is flowed through the electric circuit of the heater for a first, longer duration, and wherein during the second calibration, the second, higher electric current is flowed through the electric circuit of the heater for a second, shorter duration. In any or all of the preceding examples, additionally or optionally, the first calibration method further includes, independent of exhaust temperature, initiating spark at maximum brake torque (MBT) of each engine cycle and wherein the second calibration method further includes, during a lower than threshold exhaust temperature, retarding spark from MBT until the exhaust temperature increases to above the threshold exhaust temperature, and then flowing the second, higher current through the electric circuit of the heater. In any or all of the preceding examples, additionally or optionally, the controller contains further instructions for: transitioning from the first calibration method used in the vehicle pre-delivery phase to the second calibration method used in the vehicle post-delivery phase responsive to one or more of a total number of miles travelled by the vehicle increasing to above a threshold number of miles and an integrated value determined as a function of a number of engine start events since assembly of the vehicle and a duration of each of the number of engine start events increasing to above a threshold value.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during a vehicle pre-delivery phase,
feed-back controlling an oxygen sensor heater element to a set-point temperature with a first, lower gain, and maintaining spark timing independent of exhaust temperature; and
during a vehicle post-delivery phase,
feed-back controlling the oxygen sensor heater element to the set-point temperature with a second, higher gain, and responsive to a lower than threshold exhaust temperature, retarding spark timing from maximum brake torque.

2. The method of claim 1, wherein retarding spark timing during the vehicle post-delivery phase includes retarding spark timing for a number of engine cycles since a first engine cycle following an engine start from rest until the exhaust temperature exceeds the threshold exhaust temperature.

3. The method of claim 1, wherein an amount of spark retard applied during the vehicle post-delivery phase is based on a measured exhaust temperature relative to the threshold exhaust temperature, the amount of spark retard increased as the exhaust temperature falls below the threshold exhaust temperature.

4. The method of claim 2, further comprising, during the vehicle pre-delivery phase, responsive to the engine start, supplying a first, lower electric voltage resulting in a first, lower current to the oxygen sensor heater element, and during the vehicle post-delivery phase, responsive to the engine start, after exhaust temperature exceeds the threshold exhaust temperature, supplying a second, higher electric voltage resulting in a second, higher current through the oxygen sensor heater element.

5. The method of claim 4, further comprising, during the vehicle pre-delivery phase, supplying the first, lower electric current through the oxygen sensor heater element until the set-point temperature is reached, and during the vehicle post-delivery phase, supplying the second, higher electric current through the oxygen sensor heater element until the set-point temperature is reached.

6. The method of claim 5, wherein the oxygen sensor heater element is coupled to an exhaust oxygen sensor, wherein the set-point temperature includes an oxygen sensor activation temperature, the method further comprising, during the vehicle pre-delivery phase, while a temperature of the oxygen sensor is below the oxygen sensor activation temperature, estimating exhaust catalyst activity based on each of the exhaust temperature, an engine speed, an engine load, and an engine temperature, the exhaust catalyst activity estimated independent of an exhaust oxygen content estimated by the oxygen sensor, and after a temperature of the oxygen sensor heater element is above the oxygen sensor activation temperature, estimating exhaust catalyst activity based on each of the exhaust oxygen content, the exhaust temperature, the engine speed, the engine load, and the engine temperature.

7. The method of claim 6, further comprising, during the vehicle pre-delivery phase, while the temperature of the oxygen sensor is below the oxygen sensor activation temperature, adjusting engine fueling via open-loop control, and after the temperature of the oxygen sensor is above the oxygen sensor activation temperature, transitioning to fueling the engine via closed-loop control.

8. The method of claim 1, wherein the vehicle pre-delivery phase includes a vehicle being operated in an assembly plant or at a dealership and wherein the vehicle post-delivery phase includes the vehicle being operated outside the assembly plant or at the dealership.

9. A method, comprising:
during a first engine start while a vehicle is operated in an assembly plant,
operating an engine with spark at a nominal timing independent of an exhaust temperature, applying a first, lower gain to feedback control of a temperature of an oxygen sensor heater to a set-point temperature, and flowing a first, lower electric current through the oxygen sensor heater until a temperature of the oxygen sensor reaches a threshold-temperature, wherein the first engine start includes one of a hot-start and a cold-start of the engine; and
during a second engine cold-start while the vehicle is operated outside the assembly plant,
operating the engine with spark timing retarded from the nominal timing until the exhaust temperature exceeds a threshold exhaust temperature, and then applying a second, higher gain to feedback control the temperature of the oxygen sensor heater to the set-point temperature and flowing a second, higher electric current through the oxygen sensor heater until the oxygen sensor temperature reaches the threshold-temperature.

10. The method of claim 9, further comprising, during a second engine hot start while in the vehicle is operated in a post-delivery phase while the vehicle is operated outside the assembly plant, operating the engine with spark timing at the nominal timing independent of the exhaust temperature, applying the second, higher gain to feedback control the temperature of the oxygen sensor heater responsive to the set-point temperature, and increasing a voltage applied to the oxygen sensor heater to flow the second, higher electric current through the oxygen sensor heater until the oxygen sensor temperature reaches the threshold temperature.

11. The method of claim 9, further comprising, during the second engine cold-start, for a first engine cycle and a number of engine cycles thereafter, operating the engine with spark timing retarded from the nominal timing until the exhaust temperature reaches the threshold exhaust temperature, and then resuming spark timing at the nominal timing.

12. The method of claim 10, wherein during the first engine start, the voltage applied to the oxygen sensor heater is decreased to flow the first, lower electric current through the oxygen sensor heater for a first, longer duration, and wherein during the second engine hot-start and second engine cold-start, the voltage applied to the oxygen sensor heater is increased to flow the second, higher electric current through the oxygen sensor heater for a second, shorter duration.

13. The method of claim 9, wherein during the second engine cold-start, an amount of spark retard applied is based on sensed exhaust temperature, the amount of spark retard increased as the sensed exhaust temperature falls below the threshold exhaust temperature.

14. The method of claim 9, wherein until the oxygen sensor temperature increases to above the threshold temperature, diagnosing an engine component independent of an output of the oxygen sensor heater, and after the oxygen sensor temperature increases to above the threshold temperature, diagnosing the engine component based on the output of the oxygen sensor heater, wherein the threshold temperature includes an oxygen sensor activation temperature.

15. A vehicle system, comprising:
a vehicle;
an engine including a cylinder;
an exhaust system including an exhaust catalyst, an exhaust temperature sensor, an oxygen sensor, and a heater including an electric circuit with a power source and a switch coupled to the oxygen sensor;
a spark plug coupled to the cylinder;
a controller with computer readable instructions stored on non-transitory memory for:
in response to a vehicle key-on event during a vehicle pre-delivery phase at an assembly plant,
applying a first calibration for heating the oxygen sensor to an activation temperature by applying a first, lower voltage to the electric circuit of the heater to flow a first, lower current through the electric circuit of the heater and by setting a first, lower gain for feedback control of an inferred heater temperature to a set-point temperature; and
in response to a vehicle key-on event during a vehicle post-delivery phase outside the assembly plant,
applying a second calibration for heating the oxygen sensor to an activation temperature applying a second, higher voltage to the electric circuit of the heater to flow a second, higher current through the electric circuit of the heater and by setting a second, higher gain for feedback control of the inferred heater temperature to the set-point temperature.

16. The system of claim 15, wherein during the first calibration, the first, lower electric current is flowed through the electric circuit of the heater for a first, longer duration, and wherein during the second calibration, the second, higher electric current is flowed through the electric circuit of the heater for a second, shorter duration.

17. The system of claim 16, wherein the first calibration method further includes, independent of exhaust temperature, initiating spark at maximum brake torque (MBT) of each engine cycle and wherein the second calibration further includes, during a lower than threshold exhaust temperature, retarding spark from MBT until the exhaust temperature increases to above the threshold exhaust temperature, and then flowing the second, higher current through the electric circuit of the heater.

18. The system of claim 16, wherein the controller contains further instructions for: transitioning from the first calibration used in the vehicle pre-delivery phase to the second calibration used in the vehicle post-delivery phase responsive to one or more of a total number of miles travelled by the vehicle increasing to above a threshold number of miles and an integrated value determined as a function of a number of engine start events since assembly of the vehicle and a duration of each of the number of engine start events increasing to above a threshold value.

* * * * *